United States Patent Office 3,611,790
Patented Oct. 12, 1971

3,611,790
METHOD AND APPARATUS FOR
QUANTITATIVE ANALYSIS
Harm Jan Brouwer and Scout Michael de Veer, Emmasingel, Eindhoven, Netherlands, assignors to U.S. Philips Corporation, New York, N.Y.
Filed Nov. 10, 1969, Ser. No. 875,233
Claims priority, application Netherlands, Nov. 19, 1968, 6816450
Int. Cl. G01n 27/50
U.S. Cl. 73—61.1 R          5 Claims

ABSTRACT OF THE DISCLOSURE

By using filters and calibrating sources which can be inserted, either singly or in combination in the supply pipe of a fluid flow upstream of a measuring cell, constituents of the fluid flow can be measured continuously and quantitatively so as to be related to the zero and calibrating points obtained. The arrangement for carrying out the method is provided with an interconnection device for zero point determination, calibration and measurement and can be used in unattended measuring stations using remote control and remote measurement.

The invention relates to a method of continuously and quantitatively determining one or more constituents of a fluid, in which a flow means causes a given quantity of the fluid to flow through a measuring cell, so that there is produced at measuring elements of the measuring cell a measuring signal which is a measure of the amounts of the constituents to be measured.

Such a method is known from United States patent specification 2,621,671. This known method provides the possibility of continuously obtaining from the flow of materials, through an electric signal, a quantitative indication of constituents contained in this material (column 2, lines 31 to 36). Further, it is stated in column 15, lines 27 to 31, that the measuring method can be used with liquids, with solid particles in liquids and with gases, and that the constituents to be measured may be in the solid, liquid or gas state (column 15, lines 56 to 58).

The known method has the disadvantage that the electric measuring signal obtained cannot simply be related to standard signals, by means of which, for example, the zero point and a fixed calibrating point of the measuring scale can be determined. The invention obviates this disadvantage and for this purpose is characterized in that during a comparatively short period of time the fluid before passing through the measuring cell is caused to flow through an absorption filter, in which the constituents to be measured are absorbed, so that a zero signal is produced at the measuring elements, whereupon the fluid before passing through the measuring cell is caused, also for a comparatively short period of tmie, to flow first through the absorption filter and then through at least one calibrating supply source which supplies to the fluid a known amount of the constituents to be measured, so that a calibrating signal is produced at the measuring elements, and finally the fluid is caused to flow directly through the measuring cell for a length of time greater than the aforementioned periods. The method according to the invention can advantageously be employed in analyses which are required to proceed continuously and in which operations to be performed by skilled operators are to be avoided as far as possible or even cannot be performed at all.

Such situations occur, for example, in unattended measuring stations in which measurements are made of the amount of certain substances contained in liquids or gases which are conveyed through a pipeline, of impurities which may occur in rivers or canals or at sites in the region where the pollution of the atmospheric air is to be measured.

In some cases the concentrations of the constituents to be measured are very small, for example, one part in ten million. The measuring instruments suitable for such sensitive measurements must regularly be checked and calibrated because drift and disturbing influences can change their response in course of time. In these cases the use of the method according to the invention enables an accurate measuring result to be nevertheless obtained, especially since for determining the calibrating points the same fluid flow is used from which the constituents to be measured are filtered or to which after filtration a known amount of constituents is added. The influence of interference components in the fluid flow, however, persists and can now be substantially eliminated by subtraction. The influence of measuring cell parameters can also be substantially cancelled.

This is shown by a calculation for an electrolytic measuring cell. The cell contains a measuring liquid through which a gas stream bubbles which contains the constituents to be measured. Further, measuring and reference electrodes connected to electric ancillary devices are arranged in the measuring liquid. Since part of the constituents to be measured is taken up in the liquid and cooperates with the electrodes through ions, measurement of an electric current permits of determining the amount of these constituents, the electric current additionally having a regenerative effect on the measuring liquid so that no chemicals or electrode material are spent.

For this calculation, the following symbols are used:

Amount of constituents to be measured in the
  gas flow, weight/volume _____ $x_m$
Rate of flow, volume/time _____ $A$
Absorption in the liquid (smaller than 1) ____ $p$
Participation in the chemical reaction _____ $q$
Delivery of calibrating source, weight/volume _ $x_y$
Constant for the electric current _____ $C$
Measuring, zero and calibrating currents,
  amperes _____ $I_m, I_o, I_y$
Interference signal in flow of constituents,
  amperes _____ $S$
Zero signal in current, for example by loss of
  chemicals (evaporation), amperes _____ $N$ Thus we have:

$$I_o = S + N$$
$$I_y = S + N + A.p.q.x_y$$
$$I_m = S + N + A.p.q.x_m$$

from which follows:

$$x_m = x_y \frac{I_m - I_o}{I_y - I_o} \qquad (1)$$

The absolute value of the measuring constant has been eliminated from the latter formula. However, during the zero, calibrating and measuring periods the constants are required to have fixed values. If the measuring reaction is non-linear, several calibrating points can be used, and the measuring range can be linearly interpolated according to Formula 1.

An arrangement for carrying out the method according to the invention is characterized in that an interconnection device, hereinafter referred to as a four-way cock, having inlets 1 and 2 and outlets 3 and 4, its inlet 1 connected to the outlet of the absorption filter, its inlet 2 connected to the pipe 5 for supplying the flow of fluid to be measured, its outlet 3 to one connection of the calibrating source and to one connection of the measuring cell, and its outlet 4 to the other connection of the calibrating source and to a first discharge pipe for the fluid flow, the other connection of the absorption filter being connected to the said supply pipe and the other connection of the measuring cell being connected to a second discharge pipe, the arrangement being such that in the zero position of the four-way cock the inlet 1 is directly connected to the outlet 3, in which case the fluid flow to be measured first passes through the absorption filter, then through the cock and finally part of it passes through the calibrating source and the remainder through the measuring cell, that further in the calibrating position of the four-way cock the inlet 1 is directly connected to the outlet 4, in which case the fluid flow to be measured passes through the absorption filter and the cock, whereupon part of the flow passes through the first discharge pipe and the remainder passes in succession through the calibrating source, the measuring cell and the second discharge pipe, and that in the measuring position of the four-way cock the inlet 2, is directly connected to the outlet 3, in which case the fluid flow to be measured passes through the four-way cock and then part of it passes through the calibrating source and the remainder through the measuring cell and the second discharge pipe.

The advantage of this arrangement consists in that the interconnection device is designed so that a calibrating source of a given type can be employed with the use of diffusion processes.

The calibrating source is required to supply a known amount of constituents to the fluid flow. For this purpose, a diaphragm may be used which separates the supply container of the calibrating source from the space through which the fluid flow is caused to pass. The constituents in the supply container can be introduced into the said space through the diaphragm by means of diffusion. In order to prevent calibrating constituents from accumulating it is necessary that the constituents which have diffused through the diaphragm are continuously conducted away. If, now, the calibrating source is provided with two connections for the fluid flow, both flow from one connection to the other and flow in the opposite direction provide the above-mentioned effect. This is simply obtainable by means of an arrangement according to the invention in which the calibrating source is utilized for one direction of flow only, namely in the calibrating position of the four-way cock.

Another embodiment of the arrangement according to the invention is characterized in that the interconnection is a multi-way cock having $n$ additional outlets, each additional outlet being connected to the inlet 1, and in that between the outlet 3 and the above-mentioned one connection of the said calibrating source there is interposed a series arrangement of $n$ calibrating sources, each pipe which connects two of the calibrating sources being connected to one of the $n$ additional outlets.

This arrangement enables several calibrating points of the measuring scale to be determined all the calibrating sources being arranged in series and, depending on the calibrating position of the multi-way cock, a calibrating point being obtained by adding the outputs of a number of calibrating sources whilst the remaining sources are being ventilated.

The interconnection device may contain a plurality of controllable valves which are disposed in pipes connecting the inlets and the outlets of the interconnection device. Owing to the comparatively large number of pipes and valves leakage may occur. Also, complicated controlling and programming of the valves is necessary, which makes the device expensive.

A simple and cheap embodiment of the interconnection device according to the invention is characterized in that the interconnection device comprises a casing and a rotatable plug which is fitted in the casing and establishes the said connections between the outlets and the inlets of the casing. A cheap embodiment of the interconnection device may be a cock having a rotatable plug fitted in the cock body, the assembly being made of glass or Teflon.

As has been mentioned hereinbefore, the invention can advantageously be applied to unattended measuring stations. If actuating signals and measuring results are to be transmitted to a remote location, for example by means of a telephone line, these results and signals must be available in electric form. Controllable valves can be electrically operated, and a multi-way cock having a rotatable plug can be adapted to electric operation in that in one embodiment of the arrangement the plug shaft is coupled to a remotely controllable motor.

Embodiments of the invention, given by way of example only, will now be described more fully with reference to FIGS. 1 to 6.

Figure 1:
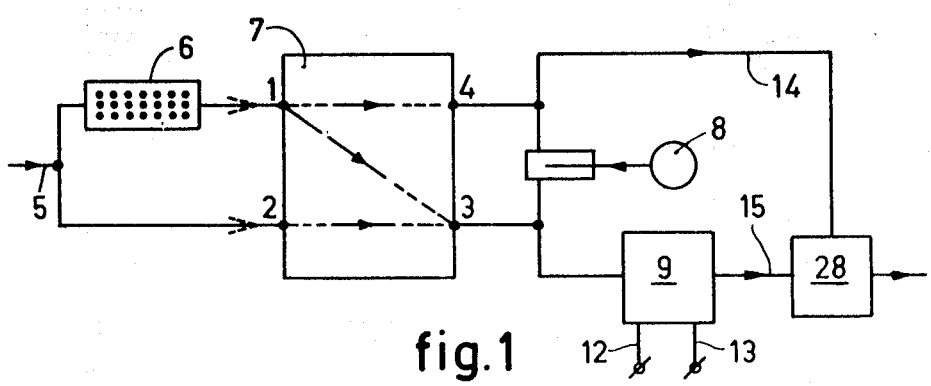
FIG. 1 is a block diagram of an arrangement according to the invention.

Referring now to FIG. 1, a fluid to be examined to determine whether certain substances are present in it, is supplied through a supply pipe 5. Depending upon the position of an interconnection device 7, hereinafter referred to as a four-way cock, which term is to be understood to mean a device having 4 ports, namely two inlets and two outlets, and provided with the possibility of connecting only one of the inlets to only one of the outlets, the fluid either passes through an absorption filter 6 and an inlet 1 of the four-way cock 7 or it flows directly to an inlet 2 of the four-way cock 7.

In the arrangement according to the invention the four-way cock utilizes 3 positions: a zero position, in which the inlet 1 is connected to an outlet 3; a calibrating position, in which the inlet 1 is connected to an outlet 4; and a measuring position in which an inlet 2 is connected to the outlet 3. The connections may be established by controllable valves arranged in ducts connecting the inlets to the outlets or by means of a rotatable cylindrical plug, which will be described more fully with reference to FIGS. 3 and 4.

From the fluid flow, which in the zero and calibrating positions of the four-way cock 7, passes through the inlet 1, those constituents have been removed by the absorption filter 6 which are to be measured in the measuring cell 9. In the zero position a fluid flow from the outlet 3 can be passed through the measuring cell 9 so as to produce in this cell a zero signal which can be taken from terminals 12 and 13.

The calibrating source 8 has two connections. To one connection is secured a pipe leading to the outlet 4 of the four-way cock 7, and a T-member included in this pipe there is connected a first discharge pipe 14. To the other connection there is secured a pipe which leads to the outlet 3 of the four-way cock 7, the supply pipe for the measuring cell 9 being secured to a T-member in this pipe. The calibrating source 8 includes a supply container in which the constituents to be measured are stored in concentrated form.

By means of a diffusion process this supply container continuously supplies a determined amount of constituents to a space equipped with the above-mentioned pipe connections, provided that fluid continues flowing from one connection to the other or vice versa. Thus, in order to use this calibrating source as such, fluids flows through it, both in the position of the four-way cock in which fluid issues from the outlet 4 and in the positions in which fluid is discharged from the outlet 3 of the four-way cock. However, only in the calibrating position, i.e. the position in which fluid is discharged from the outlet 4, the calibrating source is effectively utilized. When the fluid flow— from which the constituents to be measured have been removed—has issued from the outlet 4, it divides into a flow which is discharged through the discharge pipe 14 and into another flow to which the calibrating source 8 supplies a known amount of constituents to be measured, which subsequently are detected in the measuring cell 9 so that a calibrating signal can be taken from the terminals 12 and 13. This fluid flow leaves the measuring cell 9 through a second discharge pipe 15. Reference numeral 28 schematically designates a flow means which ensures that a known rate of flow is maintained in the discharge pipes 14 and 15.

Figure 2:
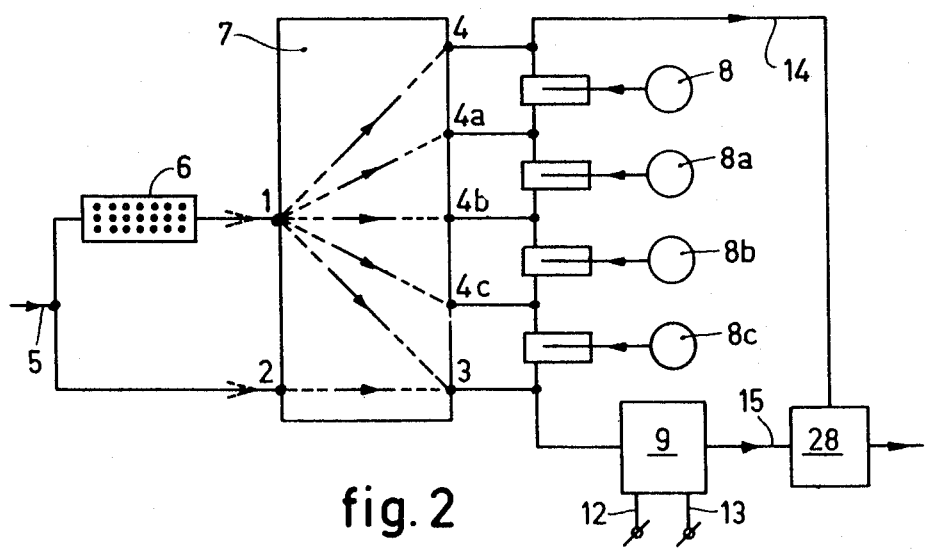
FIG. 2 shows the arrangement in more detail with the use of several calibrating sources.

FIG. 2 shows the arrrangement shown in FIG. 1 extended to include more calibrating points. Besides the outlet 4 of the interconnection device 7, additional outlets 4a, 4b and 4c have been provided which similarly to the outlet 4 can be connected to the inlet 1. Calibrating sources 8a, 8b and 8c have been arranged in series with the calibrating source 8.

When, for example, the muilti-way cock 7 is in the calibrating position 1–4b, part of the purified fluid flow passes through the calibrating sources 8b and 8c to the measuring cell 9. The calibrating point now is determined by the sum of the outputs of the calibrating sources 8b and 8c. The remaining part of the fluid flow ventilates the calibrating sources 8a and 8 through the pipe 14.

Figures 3, 4:
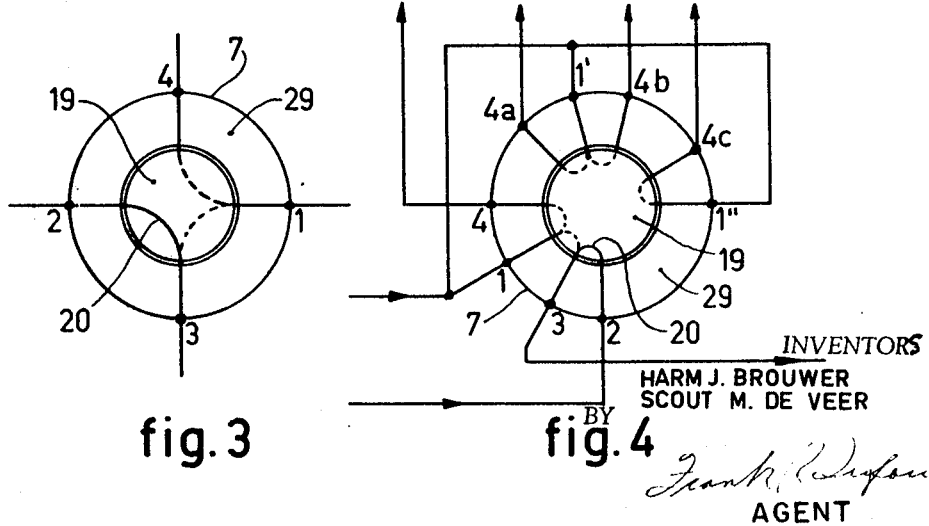
FIG. 3 is an embodiment of the four-way cock of FIG. 1.
FIG. 4 is an embodiment of the multi-way cock of FIG. 2.

FIG. 3 shows diagrammatically a four-way cock of the kind preferably used in analyses performed by means of an arrangement as shown in FIG. 1. The interconnection device or four-way cock 7 has a casing 29 in which the inlets 1 and 2 and the outlets 3 and 4 have been provided by means of ducts and connection devices. A plug 19 containing a connecting duct 20 is rotatably secured in the casing 29. The plug 19 fits in the casing 29 in a gas-tight manner. By rotating the plug 19 the designed connection between an inlet and an outlet can be established.

FIG. 4 shows the multi-way cock of FIG. 2. By providing an inlet 1 at several locations along the periphery of the casing 29, namely at 1′ and 1″, a connection by way of the duct 20 in the plug 19 can rapidly be established to several outlets by rotation of the plug 19. Alternatively, if this should be desirable for certain purposes, a filter may be provided upstream of the inlet 1′ or 1″.

Figure 5:
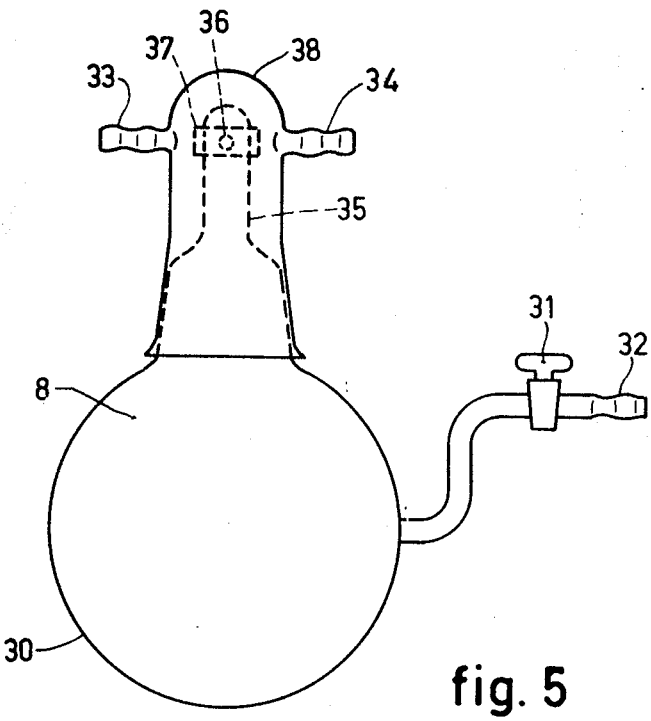
FIG. 5 shows a calibrating source for gases to be used for low concentrations.

A calibrating source for low gas concentrations is shown in FIG. 5. The calibrating source 8 mainly comprises a supply container 30 having a neck 35 and a flow chamber 38 secured to the container 30 in a gas-tight manner and provided with pipe connections 33 and 34. The supply container 30 can be filled through an inlet 32 containing a cock 31. A small aperture to surround the neck neck 35. A sleeve 37 is arranged to surround the neck 35 very closely so as to cover the aperture 36. The supply container 30 is filled with the calibrating gas in concentrated form, as the case may be partly in the form of a liquid. The pressure in the container 30 preferably is equal to the pressure in the chamber 38 in order to avoid leakage and sealing troubles. By making the sleeve 37 of a special substance, a semipermeable wall is obtained through which a constant weight of the calibrating gas diffuses per unit time, some of the factors determining the amount being the material and the thickness of the sleeve and the surface area of the aperture 36. Thus, a calibrating source of this construction can supply an amount of calibrating gas g of a few tenths of a microgram per minute. The number of parts per million (p.p.m.) supplied to the gas flow is given by the following formula:

$$\frac{g \text{ micrograms/min.}}{A \text{ litres/min.}}$$

Figure 6:
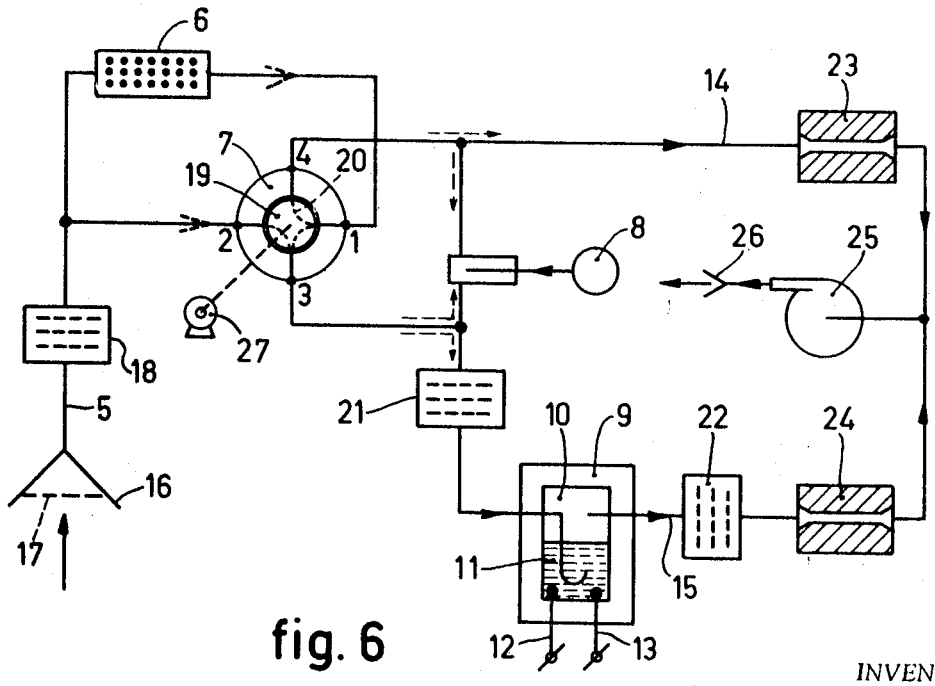
FIG. 6 shows diagrammatically an arrangement according to the invention for measuring air pollution.

FIG. 6 shows diagrammatically an arrangement according to the invention used for the continuous measurement of air pollution. A four-way cock as shown in FIG. 3 is used. The spindle of the plug 19 is coupled to a remotely controllable motor 27, so that the connecting duct can be rotated to establish the desired connection between an inlet and an outlet.

FIG. 6 further shows a flow arrangement which is preferably used and which comprises a capillary passage 23 in the discharge pipe 14, a capillary passage 24 in the discharge pipe 15 and a vacuum pump 25 having a discharge aperture 26.

The capillary apertures serve as gas flow regulators and their throttling function is used to obtain a suitable division of the gas flow in the above-mentioned T-member, but also and particularly to pass a known and constant amount of gas, for example 200 ml. per minute through the measuring cell.

The air to be examined for a certain impurity, for example $SO_2$, is induced through an inlet aperture 16, which is covered by gauze to keep out coarse impurities, such as insects. The supply pipe 5 includes a filter 18 to strain out dust and other particles, and there is inserted in the supply pipe to the measuring cell 9 a filter 21 to remove gaseous constituents which might interfere with the measurement of the impurity in the measuring cell. A filter 22 in the discharge pipe 15 serves to arrest traces of the measuring liquid which may be entrained by the gas flow and may clog the capillary 24.

If the arrangement, as is shown in FIB. 6, is intended to measure the concentration of $SO_2$ in the air, the vessel 10 of the measuring cell 9 is filled with an aqueous solution of potassium bromide, free bromine and sulphuric acid. The measuring cell is largely designed in the form described hereinbefore with reference to the calculation for an electrolytic measuring cell. In the case of $SO_2$ measurement the operation is as follows:

The concentration of free bromine is converted by means of a platinum electrode and a silver electrode (measuring and reference electrodes, respectively) into a redox voltage, which is compared with a known voltage. The difference between the two voltages is electronically converted into an electric current by two other electrodes (the generator electrodes) in the measuring cell. This current converts bromide ions into free bromine.

This regulating system ensures that the concentration of free bromine remains constant by new bromine being generated whenever its concentration falls below the said value. The current required for this purpose will be proportional to the amount of current consumed, and this consumption is determined by the amount of $SO_2$ which is passed through and reacts with the free bromine.

In addition, owing to evaporation some Br′ is lost by being entrained by the air which is passed through, and this is the so-called blank or zero point consumption. The said current through the generator electrodes determines the output signal.

In this case, the filter 21 clears the air flow from ozone, hydrogen sulphide, chlorine, etc. in order to prevent them from influencing the measurement of sulphur dioxide. For satisfactory calibration, the calibrating source 8 is adjusted so that an amount of $SO_2$ of the order of 1 mg. per cubic metre is supplied to the air flowing through, which corresponds to a pollution of about $0.5 \times 10^{-6}$. The measuring range of the measuring cell can be set to, for example, $1 \times$ or $3 \times 10^{-6}$, i.e. 1 or 3 p.p.m., the detectability limit lying below 25 micrograms of $SO_2$ per cubic metre, i.e. 0.01 p.p.m.

The calibrating source 8 is of the design described with reference to FIB. 5. The sleeve 37 of FIG. 5 is made of silicone rubber, the properties of which have been described in "Industrial and Engineering Chemistry" 1949, October 1957, pages 1685 and 1686, "Silicone Rubber as a Selective Barrier." The calibrating gas $SO_2$ together with a few percent of air, is contained under a pressure of 1 atmosphere absolute in the supply container of the calibrating source. Owing to the slight diffusion, this source of $SO_2$ varies by less than 5% per 3 months.

The measuring signals and the operating and signalling instructions are transmitted through an audio-frequency system by means of a telephone line to a computer which determines the calibrating and measuring cycles for each measuring station and processes the measuring data received.

Owing to the simplicity and reliability of the arrangement described and the consequent low cost, many measuring stations can check the air pollution of a region for months on end while unattended.

What is claimed is:

1. A method for continuously determining with a measuring cell, the quantity of one or more constituents in a fluid flowing from a source, comprising the steps of establishing a zero-signal in the cell by flowing the fluid from the source through an absorption filter, and there absorbing the constituents to be measured, and from there flowing the fluid through the measuring cell which would produce a zero-signal as regards the presence of the constituents to be measured, establishing a calibration signal in the cell by flowing the fluid from the source through said absorption filter and removing constituents to be measured and then supplying to the fluid a known quantity of said constituents, and then flowing the fluid to the measuring cell and establishing a calibration signal relative to the known quantity of constituents present in the fluid, and subsequently flowing the fluid from the source directly to and through the measuring cell, and measuring the quantity of said constituents as compared to the calibration signal.

2. A method according to claim 1 comprising the further steps of establishing a plurality of different calibration signals by flowing the fluid from the absorption filter selectively through any of different calibration sources, before flowing said fluid to the measuring cell.

3. Apparatus for continuously determining the quantity of one or more constituents in a fluid flowing from a source, comprising a valve having first inlet, an absorption filter for removing the constituents to be measured from the fluid flowing from the source to the valve's first inlet, a second inlet for receiving fluid directly from the source, and first and second outlets, and means for selectively connecting the first inlet with either of the outlets, and for connecting the second inlet with the second outlet, a measuring cell for measuring the quantity of constituents present in the fluid flowing from either of said valve outlets, a calibration source between the first valve outlet and the measuring cell for providing a known quantity of said constituents into said fluid.

4. Apparatus according to claim 3 wherein the valve has $n$-outlets connectible to the first inlet, and the apparatus further comprises $n$-calibration sources, each of said valve outlets connectible to two of said calibration sources.

5. Apparatus according to claim 3 wherein the valve means is a four-way cock.

References Cited

UNITED STATES PATENTS

| 2,621,671 | 12/1952 | Eckfeldt | 137—5 |
| 3,167,949 | 2/1965 | Stenzel et al. | 73—61.1 |
| 3,206,449 | 9/1965 | Van Luik, Jr. | 73—28 X |
| 3,247,702 | 4/1966 | Houser et al. | 73—1 |
| 3,300,282 | 1/1967 | Risk et al. | 73—23 X |

LOUIS R. PRINCE, Primary Examiner

J. W. ROSKOS, Assistant Examiner

U.S. Cl. X.R.

73—1 R, 28